US012110660B2

(12) United States Patent
Wright et al.

(10) Patent No.: US 12,110,660 B2
(45) Date of Patent: Oct. 8, 2024

(54) WORK MACHINE 3D EXCLUSION ZONE

(71) Applicant: Caterpillar Inc., Peoria, IL (US)

(72) Inventors: Christopher Wright, Peoria, IL (US); Justin Steinlage, Mackinaw, IL (US)

(73) Assignee: Caterpillar Inc., Peoria, IL (US)

( * ) Notice: Subject to any disclaimer, the term of this patent is extended or adjusted under 35 U.S.C. 154(b) by 297 days.

(21) Appl. No.: 17/679,680

(22) Filed: Feb. 24, 2022

(65) Prior Publication Data

US 2023/0265640 A1    Aug. 24, 2023

(51) Int. Cl.
*E02F 9/20* (2006.01)
*E02F 9/22* (2006.01)
*E02F 9/26* (2006.01)
*G06T 7/73* (2017.01)
*G06V 10/82* (2022.01)
(Continued)

(52) U.S. Cl.
CPC .......... *E02F 9/2033* (2013.01); *E02F 9/2029* (2013.01); *E02F 9/2253* (2013.01); *E02F 9/262* (2013.01); *E02F 9/265* (2013.01); *G06T 7/73* (2017.01); *G06V 10/82* (2022.01); *G06V 20/58* (2022.01); *G06V 30/1444* (2022.01); *G06T 2207/10012* (2013.01); *G06T 2207/10028* (2013.01); *G06T 2207/20084* (2013.01); *G06T 2207/30252* (2013.01)

(58) Field of Classification Search
None
See application file for complete search history.

(56) References Cited

U.S. PATENT DOCUMENTS

| 9,052,716 B2 | 6/2015 | Tanaka et al. |
| 10,228,232 B2 | 3/2019 | Friend et al. |
| 11,085,168 B2 | 8/2021 | Nakamura et al. |

(Continued)

FOREIGN PATENT DOCUMENTS

| JP | 2021038571 A | 3/2021 |
| JP | 2021156080 A | 10/2021 |

(Continued)

OTHER PUBLICATIONS

Written Opinion and International Search Report for Int'l. Patent Appln. No. PCT/US2023/061415, mailed May 9, 2023 (12 pgs).

*Primary Examiner* — Jaime Figueroa
*Assistant Examiner* — Jerrod Irvin Davis

(57) ABSTRACT

A work machine, a first method of defining a virtual 3D exclusion zone, and a second method of preventing collisions involving a work machine are disclosed. The work machine comprises a body, an implement arm, an imaging assembly, and an electrohydraulic assembly configured to prevent the implement arm from intersecting a 3D exclusion zone. The first method comprises scanning a local environment, generating a virtual 3D representation, identifying key structures, and generating a virtual 3D exclusion zone encompassing the key structures. The second method comprises defining a virtual 3D exclusion zone, monitoring a motion of the work machine, and adjusting the motion to avoid an intersection between the work machine and the 3D exclusion zone. The 3D exclusion zone may be implemented for a number of machines, environments, and key structures without unduly removing control from a human operator.

19 Claims, 8 Drawing Sheets

(51) Int. Cl.
*G06V 20/58* (2022.01)
*G06V 30/14* (2022.01)

(56) References Cited

U.S. PATENT DOCUMENTS

| | | |
|---|---|---|
| 2013/0237811 A1 | 9/2013 | Mihailescu et al. |
| 2013/0261903 A1* | 10/2013 | Hargrave, Jr. .......... E02F 9/262 |
| | | 701/50 |
| 2017/0284057 A1* | 10/2017 | Moriki .................. E02F 9/2041 |
| 2018/0341268 A1 | 11/2018 | Taylor et al. |
| 2020/0199853 A1 | 6/2020 | Konda et al. |
| 2020/0277752 A1 | 9/2020 | Igarashi et al. |
| 2021/0165414 A1 | 6/2021 | Aizawa et al. |
| 2021/0310219 A1 | 10/2021 | Aizawa et al. |
| 2022/0333346 A1* | 10/2022 | Mizuochi ............... H04W 4/021 |
| 2023/0417018 A1* | 12/2023 | Ohta ........................ E02F 3/43 |

FOREIGN PATENT DOCUMENTS

| | | |
|---|---|---|
| WO | 2015187081 A1 | 12/2015 |
| WO | 2020206426 A1 | 10/2020 |

* cited by examiner

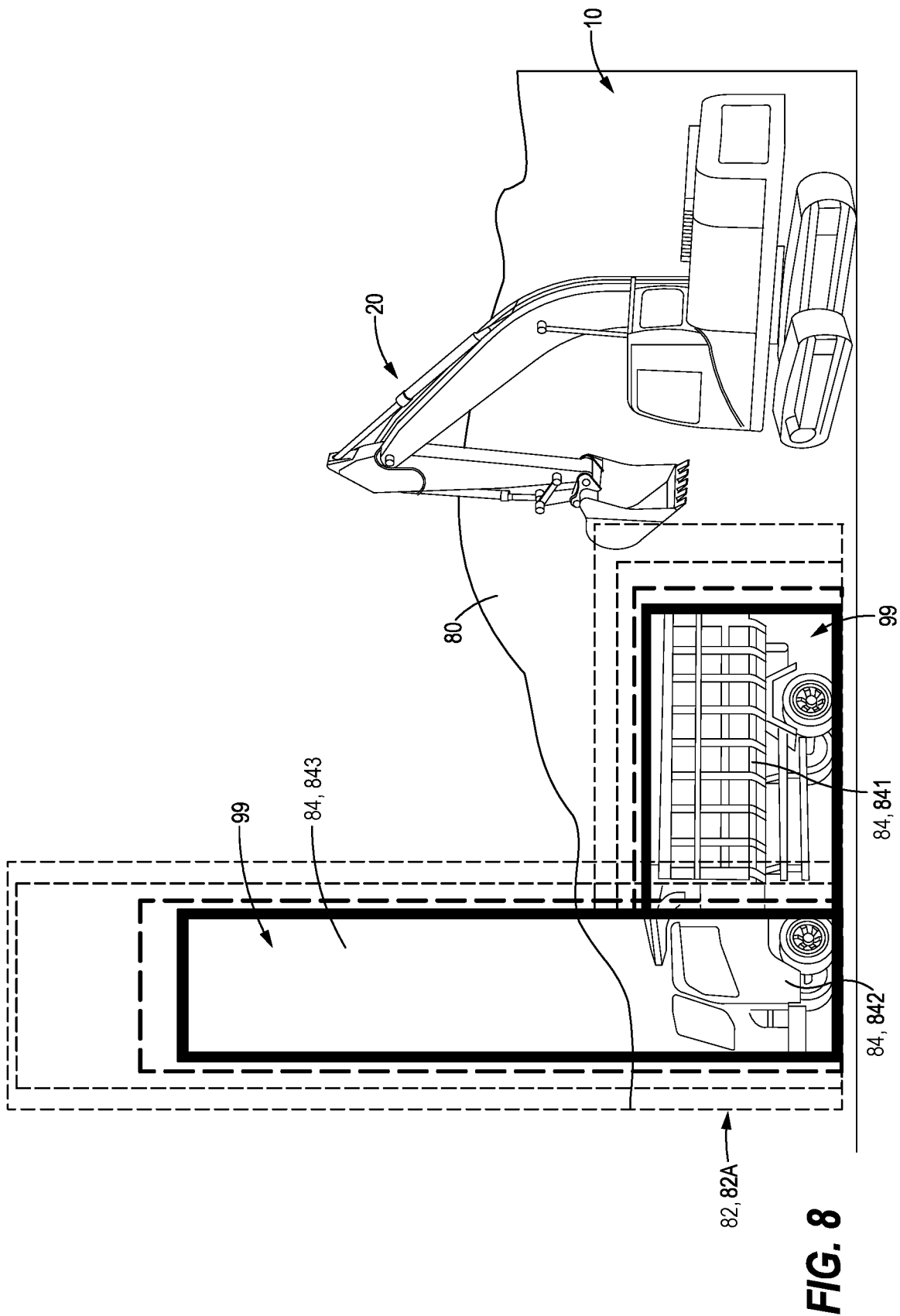

WORK MACHINE 3D EXCLUSION ZONE

TECHNICAL FIELD

The present disclosure generally relates to a system and method for protecting a work machine and, more specifically, to a system and method for creating a virtual 3D exclusion zone designed to prevent collisions involving a work machine.

BACKGROUND

Earth moving equipment, such as excavators, backhoes, loaders, and the like are designed to handle heavy loads and to operate in difficult work environments. Accordingly, the proper and careful operation of such equipment is a preeminent concern for manufacturers, employers, and personnel alike. On the human end, an operator may require formal training and certification to drive any given machine, and must remain well aware of the machine's movements and surroundings during operation. To assist the operator, protective protocols are also built into the machine self. Common examples of machine protective features may include audible reverse gear alarms, speed or weight limiters, scissor point guards, overhead guards, traction controls, and other possible systems and devices, depending on the machine in question and its use cases.

One category of machine protective features relates to the space that a machine may enter and/or occupy. Namely, a machine and its components must not enter a space where an obstacle, such as another vehicle, personnel, or physical feature, is present, and should preferably avoid said spaces with a degree of tolerance. Similarly, heavy loads should not be maneuvered above other vehicles or personnel. While these guidelines traditionally fall under the responsibilities of a human operator, they may be reinforced or safeguarded by automated means.

Within related arts, the use of computer vision is generally known to identify patterns and features within images and/or video. For example, methods and technologies relating to image processing, feature extraction, and object recognition, among others, may be used to identify objects and terrains, to track surfaces or planes in a three-dimensional (3D) environment, and to generally assist or augment optical perception by human eyes alone.

Within related arts, the use of 3D scanning is generally known to enable digital reconstruction of real-world objects. For example, methods and technologies involving contact scanning, time-of-flight (TOF) 3D laser scanners, or stereo photography, among others, may be used to generate virtual 3D representations of an object or environment.

Regarding protective features involving allowable spaces of operation, the prior art has disclosed a number of systems designed to prevent collisions between a work machine and surrounding obstacles and/or vehicles. These systems may utilize a combination of the machine's proprioceptive sensors and the known coordinates of adjacent obstacles to calculate allowable maneuvers on the part of the machine. However, the prior art has failed to provide for a method of protecting a work machine through the application of a virtual 3D exclusion zone, where said 3D exclusion zone may be tunable to a plurality of work machines, operating environments, and/or obstacles for avoidance.

One example of prior art may be found in U.S. Publication no. 2020/0199853 designed by Konda et al. and assigned to Komatsu Ltd. Konda discloses a method and a control device for manipulating a loading machine with respect to a transport vehicle. During an earth moving operation, the method first acquires a position and an azimuth direction of both the loading machine and the transport vehicle. The method then specifies an earth removal position with respect to the machine and a bucket position with respect to a bucket of the machine, i.e. positions where a load target may best be transferred from the bucket onto the transport vehicle. Konda further discloses an interference avoidance strategy which outputs restricted positions for the load machine and its bucket, which include a space physically occupied by the transport vehicle.

Unfortunately, the system disclosed by Konda may be applicable to only a limited number of scenarios, and may lose efficacy in less optimal operating conditions. For instance, Konda does not account for a polar angle of either machine, i.e. a vehicle tilt when stationed on uneven terrain. Moreover, the disclosed interference avoidance strategy is designed to prevent only those collisions involving a swing-body type loading machine and a transport vehicle of uniform height, and may fail to apply to work machines comprising other ranges of motion or collision risks. Finally, the disclosed control device removes finer manual controls from the hands of a human operator by automating the signals outputted to the machine's actuators. Each of these issues exemplifies a general lack of versatility within the solutions proposed by the prior art.

Accordingly, there remains a need in the art for a system and method of implementing a virtual 3D exclusion zone for a work machine, said 3D exclusion zone being operable in a number of diverse environments and being programmable to avoid any number of diverse obstacles or spaces, without unduly removing control from a human operator.

SUMMARY OF THE DISCLOSURE

According to a first aspect of the present disclosure, a method of defining a virtual 3D exclusion zone is disclosed. The method comprises scanning a local environment of a first work machine; identifying a second work machine within the local environment; generating a virtual 3D representation of the local environment and the second work machine; identifying one or more key structures of the second work machine; orienting the first work machine with respect to the local environment; and generating a virtual 3D exclusion zone encompassing the key structures, wherein the 3D exclusion zone defines a space that should not be occupied by the first work machine.

According to a second aspect of the present disclosure, a method of preventing collisions involving a work machine through application of a virtual 3D exclusion zone is disclosed. The method comprises orienting the work machine with respect to a local environment; defining a virtual 3D exclusion zone; monitoring a motion of the work machine; predicting if the motion will result in an intersection between the work machine and the 3D exclusion zone; and, if an intersection is predicted, adjusting the motion to avoid the intersection.

According to a third aspect of the present disclosure, a work machine is disclosed. The work machine comprises a body; an implement arm supported by the body; an imaging assembly configured to define a 3D exclusion zone; a power unit; and an electrohydraulic assembly operatively powered by the power unit. The imaging assembly further includes one or more 3D imaging devices supported by the implement arm, and an image processing unit. The electrohydraulic assembly further includes one or more implement actuators configured to control a motion of the implement arm, one or more implement sensors configured to monitor a motion of the implement arm, and an electrohydraulic control unit (ECU) configured to command the implement actuators and prevent the implement arm from intersecting the 3D exclusion zone.

BRIEF DESCRIPTION OF THE DRAWINGS

FIG. 8 is an illustration of a first work machine, a second work machine, a local environment, a virtual 3D exclusion zone, and a virtual 3D deceleration zone according to another embodiment of the present disclosure.

These and other aspects and features of the present disclosure will be more readily understood after reading the following description in conjunction with the accompanying drawings.

DETAILED DESCRIPTION

Figure 1:
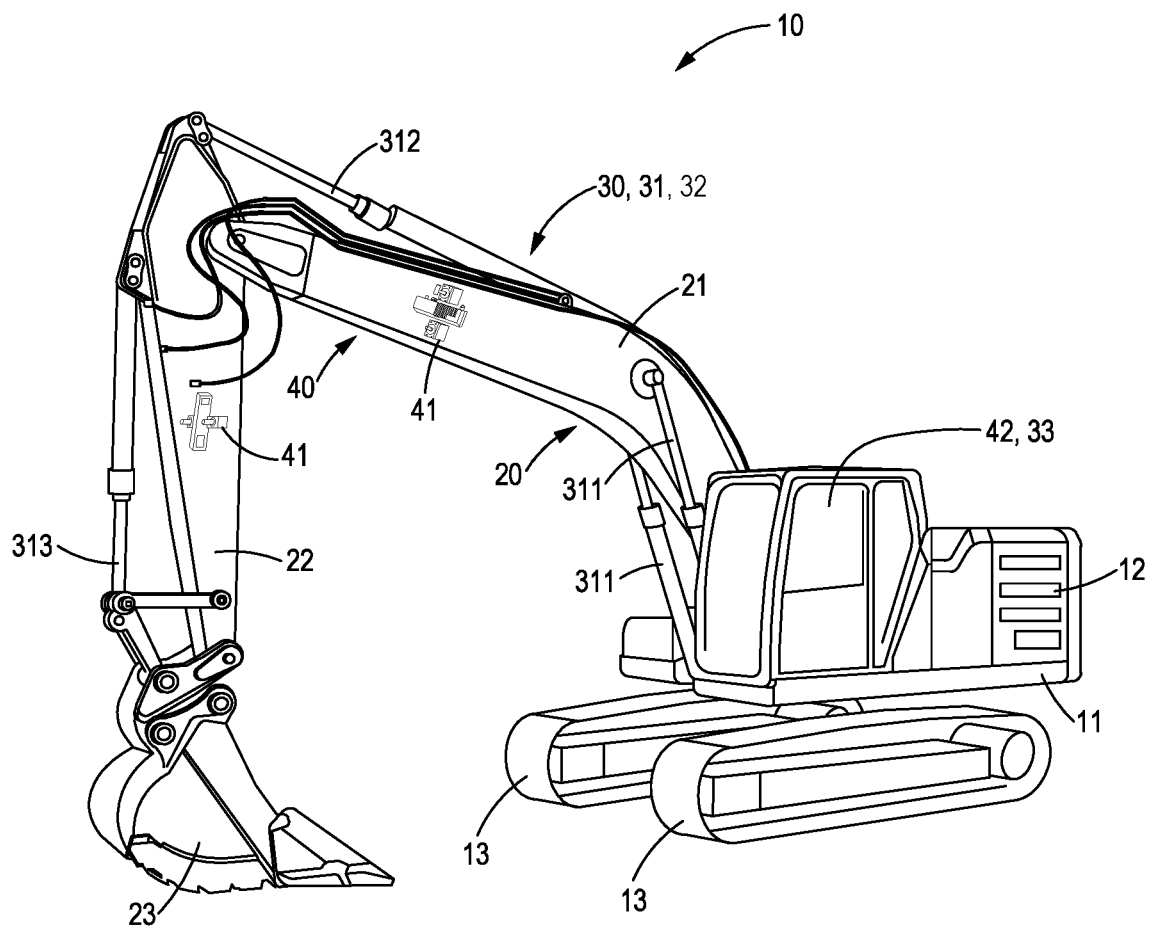
FIG. 1 is a diagram of a work machine according to an embodiment of the present disclosure.

Referring now to the drawings and with specific reference to FIG. 1, a diagram of a work machine is generally referred to by a reference numeral 10. While the work machine 10 is depicted as an excavator, the work machine 10 may alternatively be a front loader, backhoe, rope shovel, material handler, or comparable machine or vehicle comprising actuatable components with respect to a body 11 of the machine 10. More specifically, the work machine 10 may comprise the body 11, an implement arm 20 attached to and supported by the body 11, a power unit 12, a traction device 13 operatively powered by the power unit 12, and an electrohydraulic assembly 30 operatively powered by the power unit 12 and operatively controlling the implement arm 20.

The power unit 12 may include an internal combustion engine (ICE), a rechargeable electric battery, a hydrogen fuel cell, an alternative power system, and/or some combination of the above for supplying power to the machine 10 and its components. The traction device 13 may feature the pair of crawler belt as shown, or may engage the ground in a separate fashion, such as by employing wheels and tires, tracks, or the like, in order to propel the work machine 10. The body 11 may be supported by the traction device 13 and, in some embodiments, may be pivotable with respect to the traction device 13 about a pivot axis normal to the ground.

With continued reference to FIG. 1, the work machine 10 may comprise the implement arm 20. In the exemplary configuration, the work machine 10 may be an excavator and the implement arm 20 may include a boom 21 pivotably connected to the body 11 at a proximate end and pivotably attached to a stick 22 at a distal end. Likewise, the stick 22 may be pivotably attached to the boom 21 at a proximate end and pivotably attached to a tool 23 at a distal end. In other embodiments, however, the implement arm 20 may instead include the boom 21 only, the stick 22 only, the tool 23 only, alternative or additional appendages such as a lift arm or dipper handle (not shown), and/or some combination of the above. In yet other embodiments, the work machine 10 may include more than one implement arm 20, where said implement arms 20 may or may not be identical. In any embodiment, the implement arm 20 and its appendages may be actuatable, i.e. movable, with respect to the body 11.

With continued reference to FIG. 1, the work machine 10 comprises the electrohydraulic assembly 30, including one or more implement actuators 31 configured to control a motion of the implement arm 20; and one or more implement sensors 32 configured to monitor the motion of the implement arm 20. In the exemplary configuration, the implement actuators 31 may be hydraulic cylinders, and may include boom actuators 311 configured to raise or lower the boom 21, stick actuators 312 configured to raise or lower the stick 22, and tool actuators 313 configured to manipulate the tool 23. It should be understood however, that additional or alternative actuators 31 may be included depending on the type of work machine 10, the specific appendages of the implement arm 20, their respective ranges of motion, and other applicational requirements.

The implement sensors 32 are configured to monitor the motion of the implement arm 20. In an embodiment, the implement sensors 32 may be configured to operatively monitor at least a position, a velocity and/or an angular velocity, and an acceleration and/or an angular acceleration of the implement arm 20 with respect to the machine body 11 and/or another point within a given reference frame. In the same or other embodiments, the implement sensors 32 may operatively monitor a jerk and/or an angular jerk, and yet higher orders of displacement of the implement arm 20 with respect to the machine body 11 or point. In an embodiment, the position of the implement arm 20, i.e. a space occupied by the implement arm 20, may be derived from known schematics. It may be understood that no limitation is intended for the type or quantity of kinematic properties being monitored nor the reference frames through which they are interpreted.

In the exemplary configuration, the implement sensors 32 may include a boom sensor 321 configured to monitor an elevation angle of the boom 21 with respect to the body 11, a stick sensor 322 configured to monitor an elevation angle of the stick 22 with respect to the boom 21, and tool sensors 323 configured to monitor an elevation angle of the tool 23. It should further be understood that additional or alternative sensors 32 may be included in the electrohydraulic assembly 30, and that additional or alternative displacements, angles, and derivatives thereof may be monitored, depending on the type of work machine 10, the specific appendages of the implement arm 20, their respective ranges of motion, and other applicational requirements.

The above measurements may be collected by an electrohydraulic control unit (ECU) 33 and interpreted to calculate the motion of the implement arm 20 through various means common to the art. The ECU 33 may be included in the electrohydraulic assembly 30; and may be configured to receive inputs from a machine operator (not shown), to operatively receive or calculate motion data from the implement sensors 32, and to command the implement actuators 31.

In addition, the ECU 33 may receive 3D coordinate data defining an 'exclusion zone' 99 and may command the implement actuators 31 to prevent the implement arm 20 from intersecting said exclusion zone 99, a function which will be discussed in greater detail below. In some embodiments, the ECU 33 may override the inputs received from the machine operator if a resulting intersection with the exclusion zone 99 is predicted.

Figure 2:
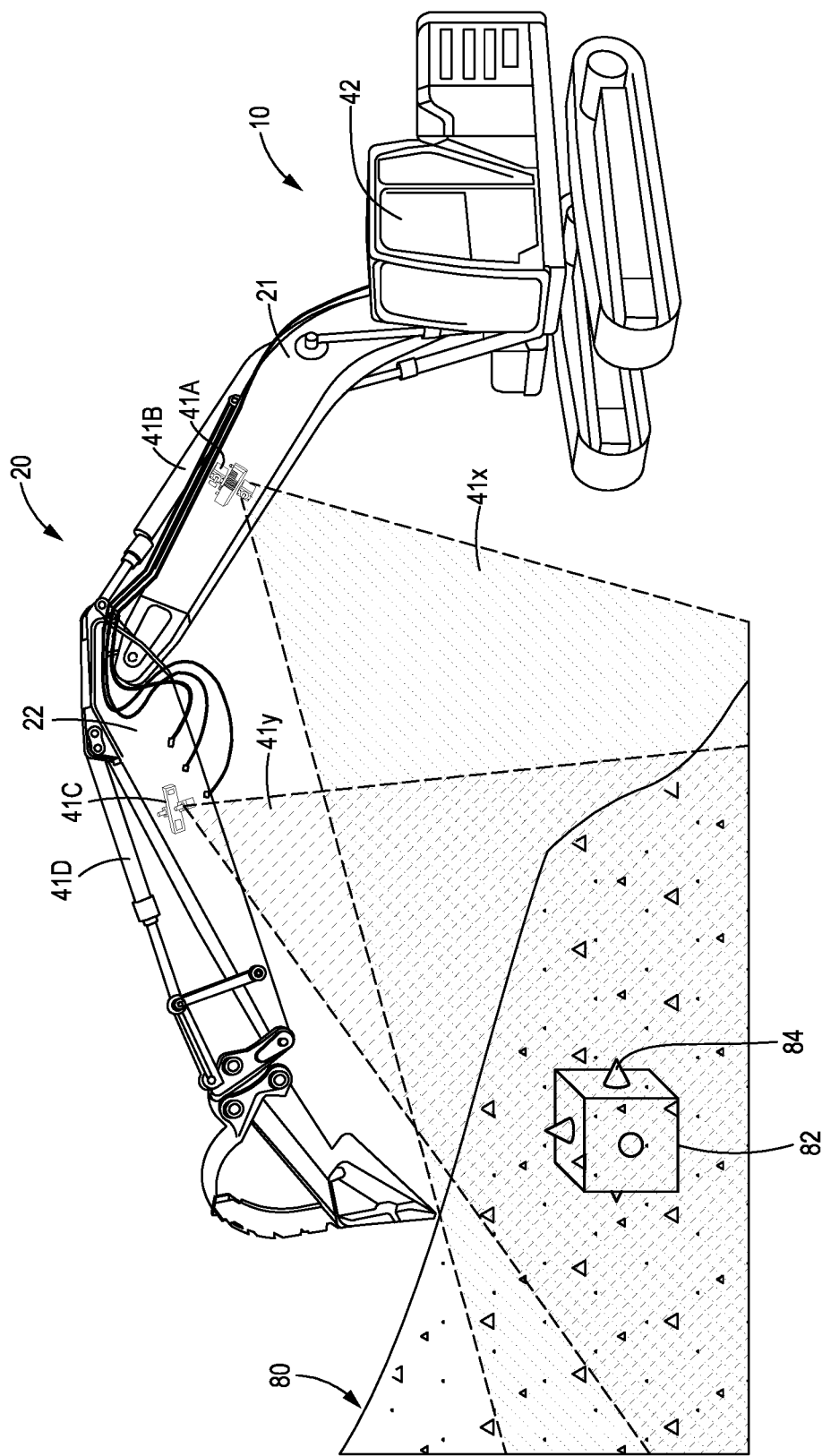
FIG. 2 is an illustration of a field-of-view (FOV) of one or more stereo cameras associated with a work machine according to another embodiment of the present disclosure.

The work machine 10 further comprises an imaging assembly 40, including one or more 3D imaging devices 41 supported by the implement arm 20 and an image processing unit 42. Turning now to FIG. 2, the imaging assembly 40 may be configured to scan a local environment 80 of the work machine, identify certain objects 82 and key structures 84, and define the 3D exclusion zone 99. The one or more 3D imaging devices 41 may continuously scan the environment 80 and feed data to the image processing unit 42.

Figure 3:
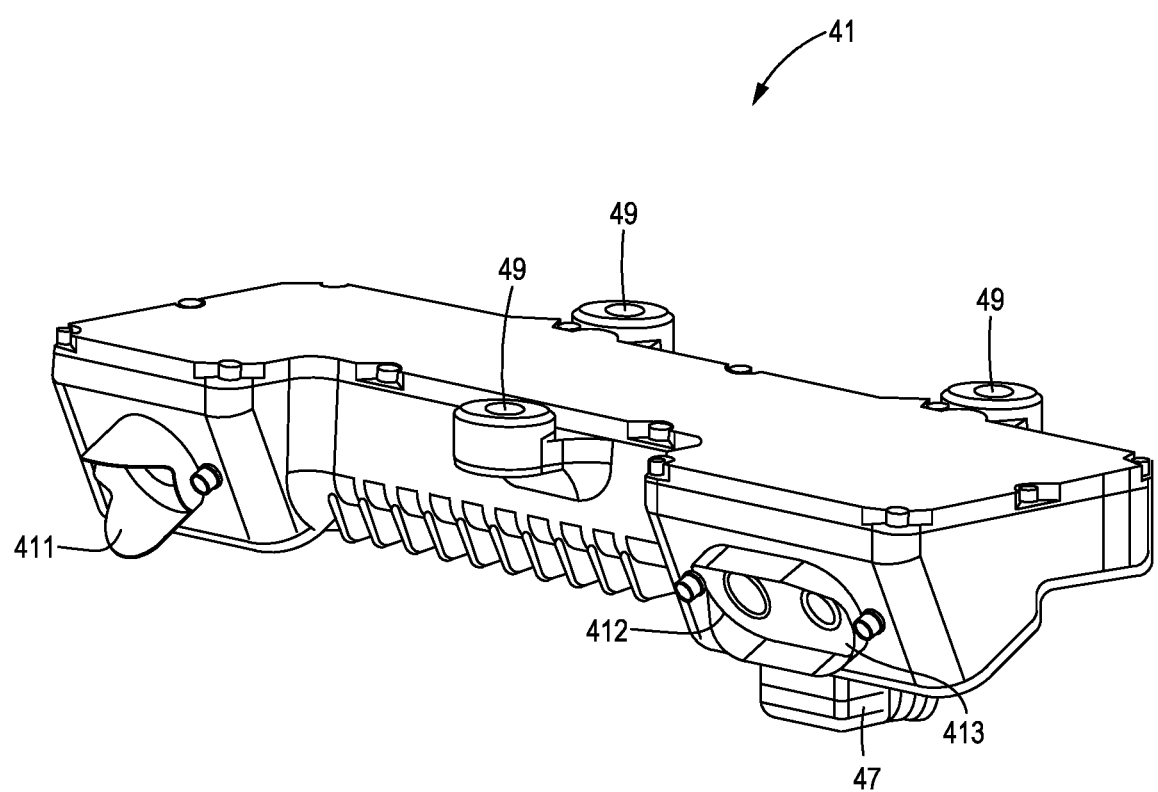
FIG. 3 is a diagram of a stereo camera associated with a work machine according to another embodiment of the present disclosure.

In an embodiment, the 3D imaging devices 41 may include two or more stereo cameras 41, where an exemplary stereo camera 41 is shown in FIG. 3. The stereo camera 41 may include at least two separate image sensors 411 and 412 and respective lens assemblies which enable the camera to capture 3D images. In various embodiments, image sensors 411 and 412 may both be monochrome sensors, such as those employing CCD or CMOS technology; or one or both may be color sensors, such as those employing Bayer filters or 3-CCD technology. In the same or other embodiments, each stereo camera 41 may further include a third image sensor 413 that is a dedicated color sensor.

In other embodiments (not shown), the 3D imaging devices 41 may instead comprise alternative imaging devices, such as TOF 3D laser scanners, structured-light 3D scanners, ultrasonic sensors, photometric cameras, or other technologies capable of enabling 3D reconstruction.

Each 3D imaging device 41 may further include one or more communication busses 47 configured to transfer real-time data to the image processing unit 42; and one or more mounting brackets 49 configured to mount the 3D imaging device 41 to the implement arm 20. The mounting bracket 49 may be designed to associate with the implement arm 20 through a variety of mechanisms common to the art, including but not limited to machine screws, bolts, magnetic mounts, interference fits, welds, and the like, which may or may not reversible.

Returning to FIG. 2, several possible installation locations and associated fields-of-view (FOV) for the 3D imaging devices 41 are shown. In the exemplary configuration, a first pair of stereo cameras 41A, 41B may be located on a left side and a right side of the boom 21, in a symmetrical fashion, and may capture an FOV 41X. In addition, a second pair of stereo cameras 41C, 41D may be located on a left side and a right side of the stick 22, in a symmetrical fashion, and may capture an FOV 41Y. In other embodiments, only the first pair 41A, 41B may be installed; only the second pair 41C, 41D may be installed; only one stereo camera 41 of each pair may be installed; and/or the stereo cameras 41 may not be symmetrically installed with respect to the implement arm 20. It should be understood that alternative placements may be provided and/or additional stereo cameras 41 may be included, depending on the appendages of the implement arm 20, their respective ranges of motion, and the applicational requirements of the work machine 10. The illustrated FOVs 41X, 41Y are exemplary only, may be wider or narrower than depicted, and may or may not be conical in shape, depending on applicational requirements. Where alternative 3D imaging devices 41 are employed, their number, placement, and FOV may further depend on the properties of the imaging devices 41 and their principles of operation.

In any embodiment, it may be understood that a placement of the 3D imaging devices 41 is designed to capture the local environment 80 of the work machine 10, including the terrain and any obstacles, vehicles, or personnel in the vicinity of the work machine 10 and/or the vicinity of the implement arm 20.

Figure 4:
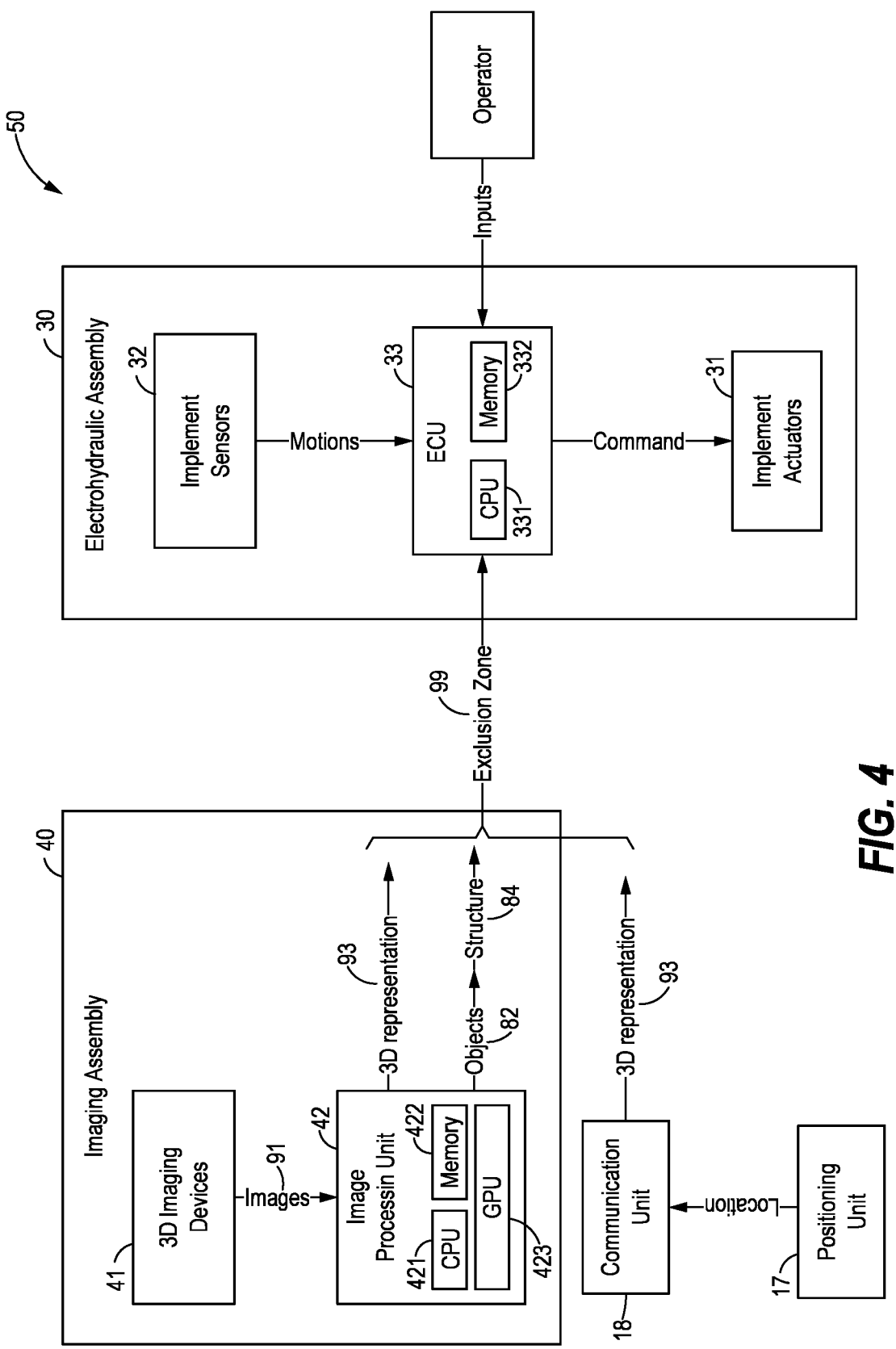
FIG. 4 is a diagram of a system architecture of a work machine according to another embodiment of the present disclosure.

Turning now to FIG. 4, a system architecture of the work machine 10 is generally referred to by a reference numeral 50. As shown in FIG. 4, the system 50 may include the imaging assembly 40 having one or more 3D imaging devices 41 and the image processing unit 42; and the electrohydraulic assembly 30 having one or more implement actuators 31, one or more implement sensors 32, and the ECU 33.

The system 50 may be configured to capture images 91 (or equivalent sensory data) descriptive of the local environment 80 via the 3D imaging devices 41. For the purposes of this disclosure, a captured "image" may refer to any data recorded by the 3D imaging devices 41, regardless of its type or file format. Next, the captured images 91 may be transferred in real-time to the image processing unit 42. In an embodiment, the image processing unit 42 may be configured to generate a 3D representation 93 of the local environment 80 from the captured images 91, to identify certain objects 82 within the local environment 80, to identify key structures 84 within or with respect to the objects 82, and to define a 3D exclusion zone 99 encompassing the key structures 84.

Still in real-time, 3D coordinate data defining the 3D exclusion zone 99 may be communicated to the ECU 33. Concurrently, the ECU 33 may monitor the motion of the implement arm 20 via the implement sensors 32, may receive inputs from a human operator of the machine 10, and may command the implement actuators 31 to prevent the implement arm 20 from entering or occupying the 3D exclusion zone 99.

With reference now to FIG. 8, an exemplary first work machine 10, object 82, key structure(s) 84, and exclusion zone 99 are depicted. In the embodiment, the object 82 being identified by the image processing unit 42 may consist of a second work machine 82A. In the same or other embodiments, the second work machine 82A may be a transport vehicle, such as dump truck, dump trailer, mining truck, off-highway truck, or comparable machine designed for carrying and transporting heavy loads; and the structures 84 being identified may include a dump bed 841, a cabin 842, and a space 843 above the cabin 842 of the second work machine 82A. In the above scenario, the ECU 33 may be operatively programmed to avoid intersection or collision between the implement arm 20 and the aforementioned structures 841, 842, 843.

In other embodiments, however, other objects 82 and structures 84 may be identified by the image processing unit 42 and applied to define the 3D exclusion zone 99. In various examples, the objects 82 may include terrain features, people, animals, other types and/or models of work machines, and/or combinations of the above, where no limitations are intended by the present disclosure. Likewise, the key structures 84 may include additional or alternative components of the second work machine 82A, additional or alternative spaces relative to the second work machine 82A, components and/or spaces with respect to other work machines, components and/or spaces with respect to other objects 82, and/or combinations of the above, where no limitations are intended by the present disclosure.

Returning now to FIG. 4, the image processing unit 42 may include a central processing unit (CPU) 421, a memory 422 in the form of a non-transitory computer-readable medium, and a graphics processing unit (GPU) 423, and may optionally include a field-programmable gate array (FPGA) 424. In various embodiments, the image processing unit 42 may be capable of performing, among other possible functions, stereo image processing and disparity mapping, 3D image mapping and object reconstruction, volume rendering, image filtering and segmentation, color analysis, edge detection, gauging and metrology, optical character recognition, pattern recognition, and/or object recognition. In an embodiment, the image processing unit 42 may be configured to implement a neural net and/or machine learning processes to enable object recognition functions, which will be discussed in greater detail below.

The ECU 33 may include a central processing unit 331 and a memory 332 in the form of a non-transitory computer-readable medium. The ECU 33 may consist of, without limitation, a gateway computer, an FPGA, an application-specific integrated circuit (ASIC), a control system of the work machine 10, or comparable computing device capable of receiving data streams in real-time and outputting commands to the implement actuators 31. In some embodiments, the ECU 33 and the image processing unit 42 may occupy the same computing devices and/or may share the same computing resources.

With continued reference to FIG. 4, the work machine 10 may further comprise a positioning unit 17 and a communication unit 18. The positioning unit 17 may be configured to locate the work machine 10 with respect to a global environment 88, such a project work site, a construction zone, a mine site, etc. In various embodiments, the positioning unit 17 may employ a global positioning system, such as the eponymous Global Positioning System (GPS); and/or may employ local positioning technologies common to the art.

The communication unit 18 may enable communication between the work machine 10 and an external database, for example one stored in a central management station (not shown), another work machine (not shown), or a fleet of work machines (not shown). In various embodiments, the communication unit 18 may employ short-range or medium-range wireless communication technologies, such as but not limited to Wi-Fi, Bluetooth, cellular, and/or other protocols common to the art.

In an embodiment, the location of the work machine 10 may be used as a key to lookup preexisting data pertaining to the local environment 80, such as a preexisting 3D representation 93 of the local environment 80. In another embodiment, the identification of an object 82 may be used as a key to lookup preexisting data pertaining to said object 82, such as a preexisting 3D representation 93 of the object 82 and/or its key structures 84.

By employing the designs of the present disclosure, a work machine 10 may avoid collisions associated with a variety of local environments 80, objects 82, key structures 84, obstacles, equipment, and/or personnel through application of a virtual 3D exclusion zone 99. Accordingly, the work machine 10 and its environment 80 may be better protected without abdicating control from a human operator.

INDUSTRIAL APPLICATION

The present disclosure may find industrial applicability toward a number of work machines or vehicles; and may be implemented to protect the work machine, its operator, its operating environment, and any proximate equipment or personnel.

The present disclosure may be particularly applicable toward work machines comprising actuatable implement arms, i.e. implement arms movable with respect to a body of the machine. Various exemplary work machines may include, without limitation, excavators, backhoes, material handlers, wheel loaders, skid steers, forest machines, and the like, whose implement arm may include a boom, stick, lift arm, dipper, tool and/or other common appendages and attachments.

The work machine may be employed in a number of diverse operating environments, such as but not limited to an open pit mine, a road construction zone, a cargo hub, etc., and may be employed within a number of diverse industries, such as but not limited to earth moving, mining, construction, transportation, agricultural, etc. The present disclosure may be particularly applicable toward environments with uneven terrain and/or environments where extra operating precautions may be desirable.

By employing the imaging systems and methods disclosed herein, a virtual 3D representation may be generated to simulate the local environment and any objects and structures therein. Said objects may include surrounding machines or vehicles, personnel or animals, terrain features, and other physical entities. Moreover, a 3D exclusion zone may be defined to encompass key structures for avoidance. Said structures may include specific aspects of the object, such as a component of a vehicle, a space relative to the vehicle, a 'bubble' surrounding a pedestrian, and the like, depending on applicational requirements. In addition, the 3D exclusion zone may be defined with a tolerance margin and further enveloped and protected by a deceleration zone.

The 3D exclusion zone may be employed in a number of protective protocols designed to protect the work machine and its surroundings. In various examples, occupation or proximity to the 3D exclusion zone may trigger warnings, alarms, automated operator overrides, and other possible responses. In particular, an automated override may decelerate or adjust a motion of the work machine without significantly interrupting machine operations.

By employing the work machine and methods of the present disclosure, collision between the machine and its surroundings may be prevented, thereby protecting the machine and its operator. Likewise, a risk of collision posed to the local environment, including equipment and personnel, may be reduced. The 3D exclusion zone may further be programmed to include overhead spaces, thereby reducing a risk posed from falling debris or falling loads. Advantageously, the present disclosure may accomplish the above protocols without unduly removing control from the operator. The disclosed 3D exclusion zone may be defined and applied in the background, and may be generally unnoticed unless an improper action is detected.

Figure 5:
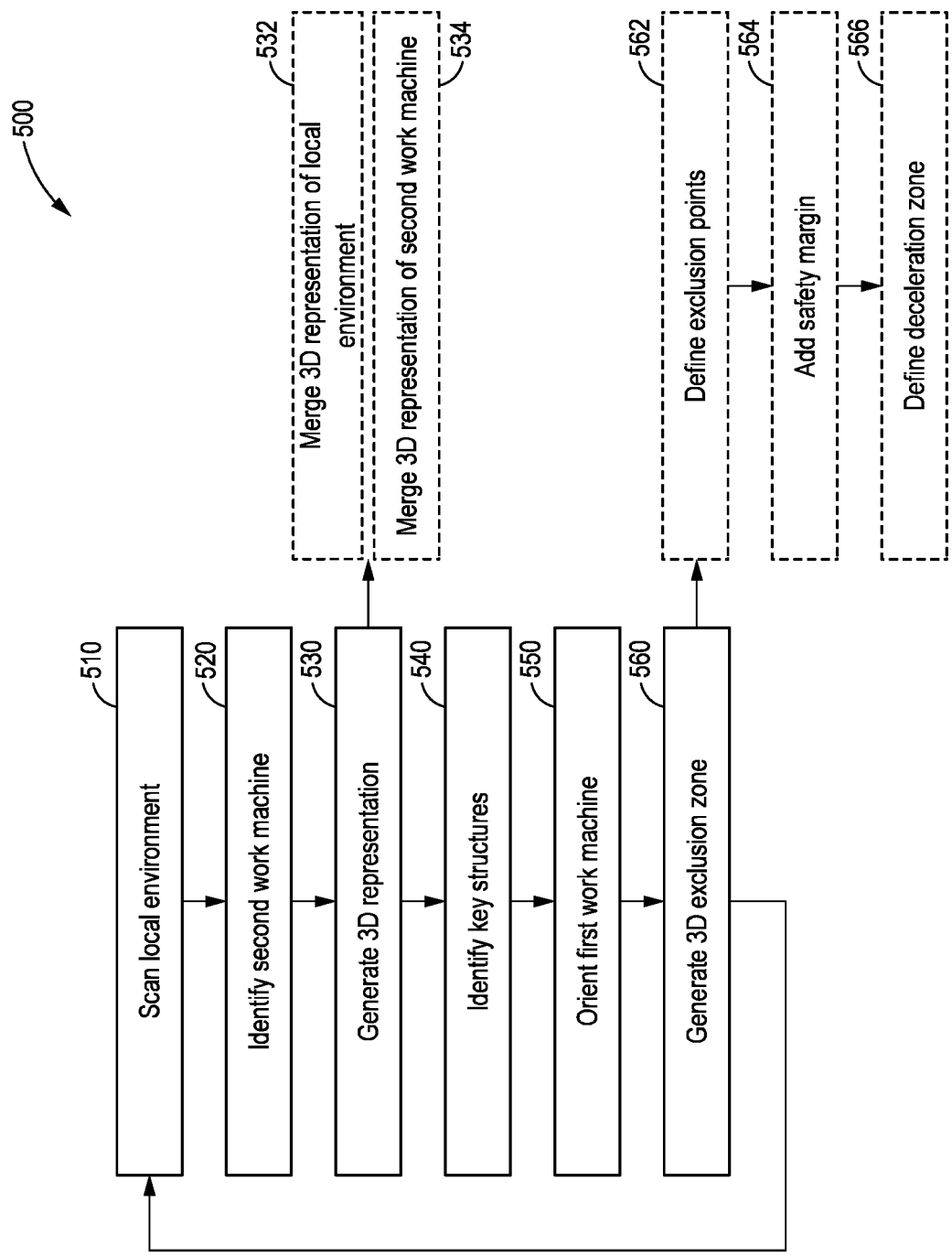
FIG. 5 is a flowchart illustrating a method of defining a 3D exclusion zone for a work machine according to another embodiment of the present disclosure.

Turning now to FIG. 5, a method of defining a virtual 3D exclusion zone is generally referred to by a reference numeral 500. The method 500 may comprise: scanning a local environment of a first work machine (block 510); identifying a second work machine within the local environment (block 520); generating a virtual 3D representation of the local environment and the second work machine (block 530); identifying one or more key structures of the second work machine (block 540); orienting the first work machine with respect to the local environment (block 550); and generating a virtual 3D exclusion zone encompassing the key structures (block 560), each step of which will be discussed in greater detail below. It may be understood that the 3D exclusion zone defines a space that should not be occupied by the first work machine, wherein the first work machine may be prevented from intersecting the 3D exclusion zone once defined.

The method 500 may comprise first scanning the local environment of the first work machine (block 510).

In an embodiment, the scanning step may include capturing a plurality of images using one or more stereo cameras located on the first work machine. Images may be captured continuously and in real-time; may be captured at regular intervals; and/or or may be captured whenever a FOV of the stereo cameras is altered.

In the same or other embodiments, the scanning step may be performed by an analogous 3D imaging device, such as a 3D scanning laser or a photometric camera. The 3D imaging device may capture data comparable to an optical image, such as but not limited to a matrix of TOF data and/or depth data within the device's FOV. For the purposes of this disclosure, a captured "image" may refer to any data recorded by the 3D imaging devices, regardless of its type or format.

The captured images may be transmitted from the 3D imaging device to an image processing unit via one or more communication buses, and may be transmitted continuously and in real-time. A frequency of the image transmittal may depend on an interval of capture or a framerate of the 3D imaging device, a bandwidth of the communication buses, a processing power of the image processing unit, and/or other specific applicational requirements.

In block 520, a second work machine may be identified within the local environment, if present.

In a first embodiment, the second work machine may comprise a fiducial marking indicative of a type, a model, a serial number, and/or other defining property of the second work machine. The image processing unit may recognize the fiducial marking in the captured image(s), for example, using a pattern recognition program, a character recognition program, and/or an analogous machine vision program known to the art, where no limitation is intended herein. It may be understood that the captured images may first be processed through a number of image transformations intended to improve an accuracy and/or an efficacy of subsequent data manipulation, such as but not limited to high-pass filtering, low-pass filtering, convolution filtering, denoising, smoothing, sharpening, and the like.

In a second embodiment, the second work machine may be identified by processing the captured images through a first neural network configured to identify a type, a model, a serial number, and/or other defining property of the second work machine. For example, the captured images may be processed through a convolution neural network (CNN) executed by the image processing unit to analyze the visual imagery and identify the second work machine from among a database of work machines. The second work machine may be identified by its machine type, i.e. transport vehicle, haul truck, tractor trailer, etc.; and/or by its manufacturer or model, depending on the design of the neural network and the depth of the vehicle database. The CNN may utilize any of a number of known neural network approaches and architectures, where no limitation is intended by the present disclosure. In some embodiments, the captured images may be transformed prior to being processed by the CNN. In the same or other embodiments, the first neural network and/or the vehicle database may also be updated with the newly captured images to improve future efficacy.

With continued reference to FIG. 5, the method 500 may comprise generating a virtual 3D representation of the local environment and of the second work machine (block 530).

In a first embodiment, wherein the 3D imaging device includes stereo cameras, a plurality of disparity maps may be built from the plurality of captured stereo images. In the same or other embodiments, a plurality of depth maps may be built from the disparity maps and/or may be built from the captured stereo images directly. Thereafter, the disparity maps and/or depth maps may be stitched together to build the 3D representation, which may depict some or all of the subject matter within the FOV of the 3D imaging devices. In various embodiments, the 3D representation may be a 3D point cloud, a CAD model, a CAM model, a polygon mesh, and/or other comparable 3D data formats.

In a second embodiment, wherein the 3D imaging device is a 3D scanning laser, each captured image may instead comprise a TOF matrix, a depth map, or a comparable data format. Accordingly, the matrices may be converted into depth maps; and/or the matrices or depth maps may be directly composited to build the 3D representation through appropriate means. No limitations are intended for the methods by which the 3D representation is composited from the captured images, which may depend on the 3D imaging device, its data type, and other applicational requirements.

In some embodiments, the generated 3D representation of the local environment may be merged with a preexisting environment model (block 532). For example, a location of the first work machine may be known from the positioning unit and may be used as a key to lookup a preexisting 3D model corresponding to said local environment. The preexisting 3D model may have been captured by an overhead drone scan, by prior land surveys, by another work machine in the past, and/or other possible sources without limitation. The preexisting 3D model may be locally stored on the work machine and/or may be stored in an external database and downloaded via the communication unit. Block 532 may include accessing the preexisting 3D model and reinforcing, supplementing, and/or improving an accuracy or resolution of the immediate 3D representation. In some embodiments, generation of the 3D representation by the first work machine may be foregone entirely and the 3D representation may be wholly sourced from preexisting data. In other embodiments, the generated 3D representation (block 530) may be uploaded to the local and/or external database for future use.

In some embodiments, the generated 3D representation of the second work machine may be merged with a preexisting work machine model (block 534). For example, after the second work machine is identified, either by fiduciary marking or determination through the first neural network, the type, model, and/or serial number of the second work machine may be used as a key to lookup a preexisting 3D model of said work machine. The preexisting 3D model may have been provided by the manufacturer, catalogued in a 3D scanning procedure, generated by another work machine in the past, and/or provided by other sources without limitation. The preexisting 3D model may be locally stored on the work machine and/or an external database. Block 534 may include accessing the preexisting 3D model and reinforcing, supplementing, and/or improving an accuracy and/or resolution of the immediate 3D representation. In some embodiments, generation of the 3D representation by the first work machine may be foregone entirely and the 3D representation may be wholly sourced from the preexisting data. In other embodiments, the generated 3D representation may be uploaded to the local and/or external database for future use.

Next, and with continued reference to FIG. 5, one or more key structures of the second work machine may be identified, if present (block 540). The key structures may include some or all of the components of the second work machine; and may further include one or more spaces or plenums with respect to the second work machine, which will be discussed below in greater detail.

In a first embodiment, the key structures may already be identified in a preexisting work machine model merged according to block 534. In such cases, the key structures may be directly acquired from the preexisting work machine model. In various embodiments, the key structures may be identified as a collection of points, planes, surfaces, volumes, parts, components, assemblies, etc. of a 3D point cloud, CAD file, CAM file, polygon mesh, or comparable data format.

In a second embodiment, the key structures may be identified by processing the plurality of captured images through a second neural network configured to identify the key structures. For example, the captured images may be processed through a CNN executed by the image processing unit to analyze the visual imagery and identify the key structures from among a database of universal key structures or key structures associated only with the second work machine. The key structures may be identified by their form, function, texture, color, size, location, relationship, and/or other qualities, depending on the design of the neural network and the depth of the structure database. The CNN may utilize any of a number of known neural network approaches and architectures, where no limitation is intended by the present disclosure. In some embodiments, the captured images may be transformed prior to being processed by the CNN. In the same or other embodiments, the second neural network and/or the structure database may also be updated with the newly captured images to improve future efficacy.

In block 550, the first work machine is oriented with respect to the 3D representation of the local environment. In an embodiment, a position, a height, an azimuth direction, and a polar direction may be acquired or calculated with respect to a reference frame of the local environment. In addition, a position or space occupied by the work machine and its components may be derived from known schematics. Block 550 may utilize information from any combination of the positioning unit, the implement sensors, the 3D imaging devices, and yet other sources, where no limitation is intended by the present disclosure.

In block 560, a virtual 3D exclusion zone is generated encompassing the key structures of the second work machine. In an embodiment, wherein the 3D representation is a 3D point cloud, the key structures may first be defined as a plurality of 'exclusion points' (block 562). Next, a volume of the 3D exclusion zone may be defined to include the plurality of exclusion points and an added tolerance margin (block 564), where the specific boundary and margin definitions may be determined by applicational requirements. In other embodiments, the 3D exclusion zone may be mapped to the key structures through other methods, such as by tracking or extrapolating upon individual points, segments, surfaces, vertices, edges, faces, polygons, parts, assemblies, etc. of the 3D representation, where no limitations are intended by the present disclosure.

In some embodiments, a 'deceleration zone' may further be defined as a collection of points or as a volume surrounding the 3D exclusion zone (block 566). In order to prevent an intersection between the first work machine and the 3D exclusion zone, the first work machine may be accordingly decelerated in the deceleration zone.

In an embodiment, the deceleration zone may be a volume defined by a distance to a surface of the 3D exclusion zone and/or a function of the distance and other factors. In the same or other embodiments, the deceleration zone may further be divided into discrete deceleration subzones based on the distance to the surface of the 3D exclusion zone and/or a function thereof. And in yet other embodiments, other methods of defining the boundaries of the deceleration zone and/or deceleration subzones may be determined by specific applicational requirements, where no limitation is intended by the present disclosure.

It may be understood that the steps of method 500 may occur in a different order than presented, that one or more steps may be obviated, and that one or more steps may be executed concurrently. In some embodiments, the method 500 may return to block 510 after generating the 3D exclusion zone; and in other embodiments, each step may be continuously repeated while the work machine is being operated.

With reference now to FIG. 8, an exemplary first work machine, second work machine, key structure, and exclusion zone are shown. The first work machine is depicted as an excavator but may alternatively comprise any loading machine having an implement arm that is actuatable, i.e. movable, with respect to a body of the machine. The second work machine is depicted as a transport vehicle whose key structures include a dump bed, a cabin, and a space above the cabin, although other machines, equipment and/or key structures are also possible and envisioned. The 3D exclusion zone is depicted by the solid rectangle encompassing the key structures, and the deceleration zone and subzones are depicted by the dashed rectangles radiating from the exclusion zone. It may be appreciated that, while a 2D zone is depicted, this is for illustration purposes only, and an equivalent 3D zone would be applied in operation. By decelerating the first work machine in the deceleration zone and by preventing the first work machine from occupying the exclusion zone, a possibility of collision and a risk posed by falling debris may be substantially reduced.

Figure 6:
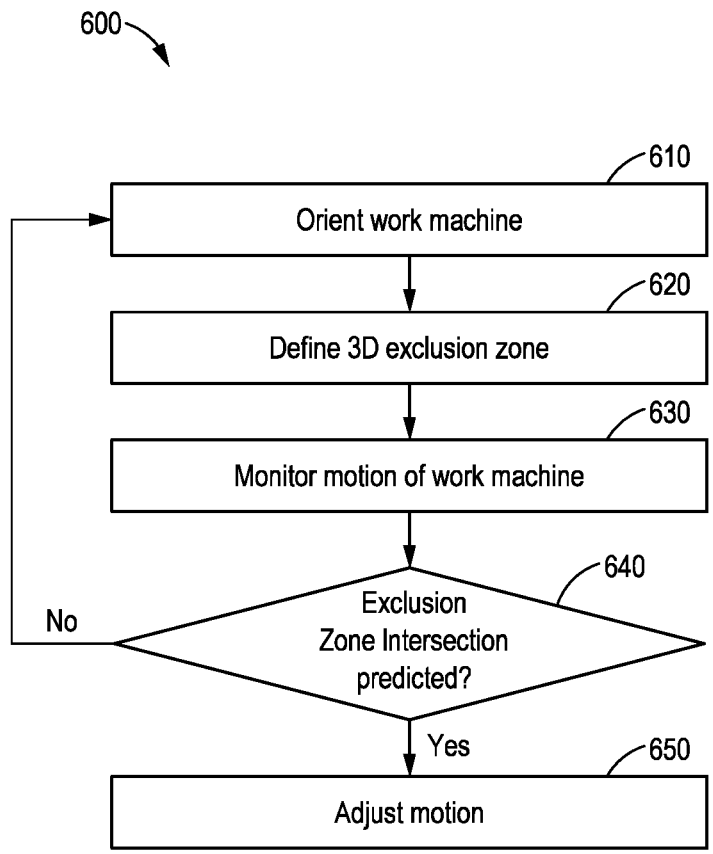
FIG. 6 is a flowchart illustrating a first method of preventing collisions involving a work machine through application of a 3D exclusion zone according to another embodiment of the present disclosure.

Turning now to FIG. 6, a first method of preventing collisions involving a work machine through application of a virtual 3D exclusion zone is generally referred to by a reference numeral 600. As seen in FIG. 6, the method may comprise orienting the work machine with respect to a local environment (block 610); defining a virtual 3D exclusion zone (block 620); monitoring a motion of the work machine (block 630); predicting if the motion will result in an intersection between the work machine and the 3D exclusion zone (block 640); and, if an intersection is predicted, adjusting the motion to avoid the intersection (block 650).

In block 610, the work machine is first oriented with respect to the local environment. Similar to block 550 of method 500, a position, a height, an azimuth direction, and a polar direction may be acquired or calculated with respect to a reference frame of the local environment. In addition, a position or space occupied by the work machine and its components may be derived from known schematics. Block 610 may utilize information from any combination of the positioning unit, the implement sensors, the 3D imaging devices, and yet other sources, where no limitation is intended by the present disclosure.

In block 620, a virtual 3D exclusion zone may be defined. The 3D exclusion zone may be defined through the embodiments of method 500, although other methods are also possible and envisioned.

In block 630, a motion of the work machine is monitored. The motion may be operatively monitored by the ECU using the implement sensors. In an embodiment, the motion may specifically include the position in 3D space occupied by an implement arm of the work machine. In the same or other embodiments, the motion may include a displacement vector and/or an angular displacement vector; a velocity vector and/or an angular velocity vector, and an acceleration vector and/or an angular velocity vector of the implement arm with respect to a reference frame of the machine and/or the local environment. Each vector may originate from a body of the work machine or a specific point within the local environment. No limitation is intended herein for the reference frame through which the vectors are interpreted, provided it remains consistent throughout the method 600. In some embodiments, the motion may further include a jerk and/or an angular jerk, and/or higher orders of displacement and/or angular displacement of the implement arm.

In block 640, the motion is predicted to result or not result in an intersection between the work machine and the 3D exclusion zone. The prediction may be executed by the ECU and may utilize the motion of the implement arm, and may further consider inputs received from the operator. If no intersection is predicted, the method 600 may restart the process from block 610.

If an intersection is predicted between the work machine and the 3D exclusion zone, the motion may be adjusted by the ECU in order to avoid the intersection (block 650), where various strategies may be employed.

In a first embodiment, a magnitude of the velocity vector may be decelerated. In the same or other embodiments, only a magnitude of the velocity vector in a direction normal to the surface of the 3D exclusion zone may be decelerated. The intensity of deceleration may be a function of the magnitude of the velocity vector and/or a function of the distance between the work machine and the surface of the 3D exclusion zone.

In a second embodiment, a magnitude of the angular velocity vector may be decelerated. In the same or other embodiments, only a magnitude of the angular velocity vector in a direction parallel to the surface of the 3D exclusion zone may be decelerated. The intensity of deceleration may be a function of the magnitude of the angular velocity vector and/or a function of the distance between the work machine and the surface of the 3D exclusion zone.

In a third embodiment, a direction of the velocity vector may be redirected; and, in a fourth embodiment, a direction of the angular velocity vector may be redirected. In additional embodiments, one or more of the above strategies, and yet additional strategies may be combined to adjust the motion of the work machine. Each adjustment may be operatively commanded by the ECU and effectuated by the implement actuators of the work machine.

It may be understood that the steps of method 600 may occur in a different order than presented, that one or more steps may be obviated, and that one or more steps may be executed concurrently. In some embodiments, the method 600 may return to block 610 after the motion is adjusted; and in other embodiments, each step may be continuously repeated while the work machine is being operated.

Figure 7:
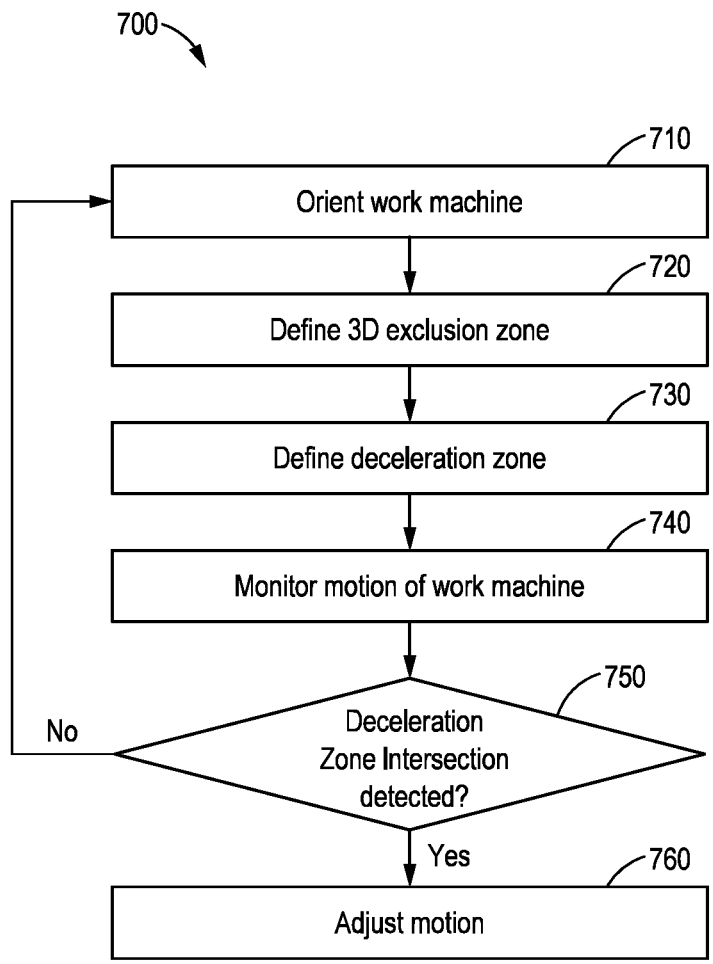
FIG. 7 is a flowchart illustrating a second method of preventing collisions involving a work machine through application of a 3D exclusion zone according to another embodiment of the present disclosure.

Turning now to FIG. 7, a second method of preventing collisions involving a work machine through application of a virtual 3D exclusion zone is generally referred to by a reference numeral 700. Similar to method 600, method 700 also comprises orienting the work machine (block 710); defining a virtual 3D exclusion zone (block 730); and monitoring a motion of the work machine (block 740). For the sake of brevity, a description of the above-referenced steps may be assumed to be identical to those of method 600 and will not be repeated herein. However, method 700 may further comprise defining a virtual deceleration zone (block 730); and detecting an intersection between the work machine and the deceleration zone (block 750), which will be discussed in greater detail below.

In block 730, a virtual deceleration zone may be defined and, in some embodiments, discrete deceleration subzones within the deceleration zone may be defined. The deceleration zone and/or deceleration subzones may be defined through the embodiments described in method 500, although other methods are also possible and envisioned.

In block 750, an intersection between the work machine and the deceleration zone is detected. The detection may be performed by the ECU and may utilize the current position of the implement arm. If no intersection is detected, the method 700 may restart the process from block 710.

If an intersection is detected between the work machine and the deceleration zone, a motion of the implement arm may be adjusted by the ECU (block 760) in order to avoid a potential intersection between the implement arm and the 3D exclusion zone. Several strategies for adjusting the motion of the implement arm are described below.

In a first embodiment, a magnitude of the velocity vector may be decelerated. In the same or other embodiments, only a magnitude of the velocity vector in a direction normal to the surface of the 3D exclusion zone may be decelerated. The intensity of deceleration may be a function of the magnitude of the velocity vector and/or a function of the distance between the work machine and the surface of the 3D exclusion zone. In those embodiments involving discrete deceleration subzones, the intensity of deceleration may be determined by and/or may be a function of the specific subzone being intersected.

In a second embodiment, a magnitude of the angular velocity vector may be decelerated. In the same or other embodiments, only a magnitude of the angular velocity vector in a direction parallel to the surface of the 3D exclusion zone may be decelerated. The intensity of deceleration may be a function of the magnitude of the angular velocity vector and/or a function the distance between the work machine and the surface of the 3D exclusion zone. And in those embodiments involving discrete deceleration subzones, the intensity of deceleration may be determined by and/or may be a function of the specific subzone being intersected.

In other embodiments, one or more of the above strategies, and yet additional strategies may be combined to decelerate the work machine in block 760. Each deceleration may be operatively commanded by the ECU and effectuated by the implement actuators of the work machine.

It may be understood that the steps of method 700 may occur in a different order than presented, that one or more steps may be obviated, and that one or more steps may be executed concurrently. In some embodiments, the method 700 may return to block 710 after the machine is decelerated; and in other embodiments, each step may be continuously repeated while the work machine is being operated.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

The invention claimed is:

1. A method of defining a virtual 3D exclusion zone, comprising the steps of:
    scanning a local environment of a first work machine;
    identifying a second work machine within the local environment;
    generating a virtual 3D representation of the local environment and the second work machine;
    identifying one or more key structures of the second work machine;
    orienting the first work machine with respect to the local environment;
    generating a virtual 3D exclusion zone encompassing the key structures, in which the 3D exclusion zone defines a space that should not be occupied by the first work machine; and
    redirecting a direction of a velocity vector of an implement arm of the first work machine or redirecting a direction of an angular velocity vector of the implement arm of the first work machine to avoid intersection of the implement arm with the 3D exclusion zone.

2. The method according to claim 1, wherein the first work machine consists of a loading machine, the second work machine consists of a transport vehicle, and the key structures of the second work machine include a dump bed and a cabin.

3. The method according to claim 1, the step of scanning the local environment further including:
    capturing a plurality of images using one or more stereo cameras located on the first work machine.

4. The method according to claim 3, the step of identifying the second work machine further including:
    recognizing a fiducial marking of the second work machine; and/or
    processing the plurality of images through a first neural network configured to identify a model of the second work machine.

5. The method according to claim 3, the step of generating the virtual 3D representation further including:
    building a plurality of disparity maps from the plurality of images; and/or
    building a 3D point cloud representative of the local environment and the second work machine.

6. The method according to claim 3, the step of identifying the key structures further including:
    acquiring the key structures from a preexisting work machine model; and/or
    processing the plurality of images through a second neural network configured to identify the key structures of the second work machine.

7. The method according to claim 1, further comprising the steps of:
    merging the 3D representation of the local environment with a preexisting environment model; and/or
    merging the 3D representation of the second work machine with a preexisting work machine model.

8. The method according to claim 7, the step of generating the virtual 3D exclusion zone further including:
    defining the key structures as a plurality of exclusion points within the 3D point cloud;
    defining a volume of a 3D exclusion zone based on the plurality of exclusion points and a tolerance margin; and
    defining a deceleration zone surrounding the 3D exclusion zone, wherein the first work machine is decelerated in the deceleration zone.

9. The method according to claim 1, wherein each step is continuously repeated while the first work machine is being operated.

10. A method of preventing collisions involving a work machine through application of a virtual 3D exclusion zone, comprising the steps of:
    orienting the work machine with respect to a local environment;
    defining a virtual 3D exclusion zone;
    monitoring a motion of the work machine, the motion includes a velocity vector of an implement arm of the work machine or an angular velocity vector of the implement arm of the work machine;
    predicting if the motion will result in an intersection between the work machine and the 3D exclusion zone; and
    if an intersection is predicted, adjusting the motion to avoid the intersection, in which the motion is adjusted by redirecting a direction of the velocity vector or redirecting a direction of the angular velocity vector.

11. The method according to claim 10, wherein the motion further includes a position, a displacement vector and/or an angular displacement vector, and an acceleration vector and/or and an angular velocity vector of the implement arm of the work machine.

12. The method according to claim 11, the step of adjusting the motion further including:
    decelerating a magnitude of the velocity vector; and/or
    decelerating a magnitude of the angular velocity vector.

13. The method according to claim 11, further comprising the steps of:
    defining a virtual deceleration zone surrounding the 3D exclusion zone;
    detecting an intersection between the work machine and the deceleration zone; and
    if the work machine intersects the deceleration zone, decelerating a magnitude of the velocity vector normal to a surface of the exclusion zone; and/or
    if the work machine intersects the deceleration zone, decelerating a magnitude of the angular velocity vector parallel to the surface of the exclusion zone.

14. The method according to claim 10, wherein the 3D exclusion zone includes a first volume encompassing a dump bed of a transport vehicle and a second volume encompassing a cabin and a space above the cabin of the transport vehicle.

15. The method according to claim 10, wherein each step is continuously repeated while the work machine is being operated.

16. A work machine comprising:
    a body;
    an implement arm supported by the body;
    an imaging assembly configured to define a 3D exclusion zone, including:
        one or more 3D imaging devices supported by the implement arm; and
        an image processing unit;
    a power unit; and
    an electrohydraulic assembly operatively powered by the power unit, including:
        one or more implement actuators configured to control a motion of the implement arm, the motion includes a velocity vector of the implement arm of the work machine or an angular velocity vector of the implement arm of the work machine;
one or more implement sensors configured to monitor the motion of the implement arm; and
an electrohydraulic control unit (ECU) configured to command the implement actuators and prevent the implement arm from intersecting the 3D exclusion zone, the intersection is prevented by the electrohydraulic control unit (ECU) redirecting a direction of the velocity vector or redirecting a direction of the angular velocity vector.

17. The work machine according to claim 16, wherein the implement arm further includes:
a boom connected to the body; and
a stick connected to the boom;
wherein the imaging assembly further includes:
a pair of stereo cameras located on a left side and a right side of the boom; and/or
a pair of stereo cameras located on a left side and a right side of the stick.

18. The work machine according to claim 16, wherein the 3D exclusion zone encompasses a dump bed, a cabin, and a space above the cabin of a transport vehicle.

19. The work machine according to claim 16, further comprising:
a traction device operatively powered by the power unit;
a positioning unit configured to locate the work machine with respect to a global environment; and
a communication unit.

* * * * *